(12) United States Patent
Mathew et al.

(10) Patent No.: US 8,175,201 B2
(45) Date of Patent: May 8, 2012

(54) SYSTEMS AND METHODS FOR ADAPTIVE EQUALIZATION IN RECORDING CHANNELS

(75) Inventors: George Mathew, San Jose, CA (US);
Yuan Xing Lee, San Jose, CA (US);
Hongwei Song, Longmont, CO (US);
Liu Jingfeng, Longmont, CO (US);
Jongseung Park, Allentown, PA (US)

(73) Assignee: LSI Corporation, Milpitas, CA (US)

( * ) Notice: Subject to any disclaimer, the term of this patent is extended or adjusted under 35 U.S.C. 154(b) by 137 days.

(21) Appl. No.: 12/663,325

(22) PCT Filed: Oct. 27, 2008

(86) PCT No.: PCT/US2008/081382
§ 371 (c)(1),
(2), (4) Date: Apr. 20, 2010

(87) PCT Pub. No.: WO2009/082542
PCT Pub. Date: Jul. 2, 2009

(65) Prior Publication Data
US 2010/0287420 A1 Nov. 11, 2010

Related U.S. Application Data

(60) Provisional application No. 61/016,231, filed on Dec. 21, 2007.

(51) Int. Cl.
| | |
|---|---|
| H03D 1/06 | (2006.01) |
| H03D 11/04 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........ 375/348; 375/232; 375/233; 375/346; 375/350; 375/234; 708/322; 708/323

(58) Field of Classification Search ................... 375/233, 375/232, 234, 235, 346, 350, 229, 348; 708/322, 708/323
See application file for complete search history.

(56) References Cited

U.S. PATENT DOCUMENTS
5,262,904 A 11/1993 Tang et al.
(Continued)

FOREIGN PATENT DOCUMENTS
GB 2 320 866 7/2009

OTHER PUBLICATIONS
U.S. Appl. No. 12/199,325, filed Aug. 27, 2008, Mathew.
(Continued)

*Primary Examiner* — Phuong Phu
(74) *Attorney, Agent, or Firm* — Hamilton, DeSanctis & Cha

(57) ABSTRACT

Various embodiments of the present invention provide systems and methods for performing adaptive equalization. For example, various embodiments of the present invention provide methods for adaptive equalization that include providing a data processing system with an equalizer circuit (210) and a target filter circuit (265). The equalizer circuit performs equalization based at least in part on an equalizer coefficient (215). The methods further include generating an error (285) based upon a first output from the equalizer circuit and a second output from the target filter circuit. An inter-symbol interference component (295) is extracted from the error (285) and used to calculate an equalizer gradient (226). Based at least in part on the equalizer gradient (226), the equalizer coefficient (215) is calculated.

20 Claims, 4 Drawing Sheets

U.S. PATENT DOCUMENTS

| | | | |
|---|---|---|---|
| 5,357,520 | A | 10/1994 | Arnett et al. |
| 5,493,454 | A | 2/1996 | Ziperovich et al. |
| 5,517,146 | A | 5/1996 | Yamasaki |
| 5,583,705 | A | 12/1996 | Ziperovich et al. |
| 5,781,358 | A | 7/1998 | Hasegawa |
| 5,986,830 | A | 11/1999 | Hein |
| 5,999,355 | A | 12/1999 | Behrens et al. |
| 6,043,942 | A | 3/2000 | Cunningham et al. |
| 6,091,560 | A | 7/2000 | Du |
| 6,130,794 | A | 10/2000 | Christensen |
| 6,134,691 | A | 10/2000 | Hirasaka |
| 6,141,168 | A | 10/2000 | Takahashi et al. |
| 6,147,828 | A | 11/2000 | Bloodworth et al. |
| 6,181,505 | B1 | 1/2001 | Sacks et al. |
| 6,208,481 | B1 | 3/2001 | Spurbeck et al. |
| 6,212,024 | B1 | 4/2001 | Igarashi et al. |
| 6,243,031 | B1 | 6/2001 | Jusuf et al. |
| 6,246,723 | B1 | 6/2001 | Bliss et al. |
| 6,337,778 | B1 | 1/2002 | Gagne |
| 6,396,651 | B1 | 5/2002 | Grover |
| 6,404,572 | B1 | 6/2002 | Hong |
| 6,535,345 | B1 | 3/2003 | Shimoda |
| 6,563,655 | B1 | 5/2003 | Yamasaki et al. |
| 6,621,648 | B2 | 9/2003 | Elliot et al. |
| 6,662,303 | B1 | 12/2003 | Toosky et al. |
| 6,671,244 | B2 | 12/2003 | Honma |
| 6,674,590 | B2 | 1/2004 | Ottesen et al. |
| 6,678,230 | B2 | 1/2004 | Miyashita et al. |
| 6,721,114 | B1 | 4/2004 | Sutardja et al. |
| 6,788,481 | B2 | 9/2004 | Fang et al. |
| 6,894,854 | B1 | 5/2005 | Carlson et al. |
| 6,912,682 | B1 | 6/2005 | Aoki |
| 6,934,100 | B2 | 8/2005 | Ueno |
| 6,937,415 | B2 | 8/2005 | Galbraith et al. |
| 6,965,638 | B2 * | 11/2005 | Warke ............................ 375/222 |
| 7,012,772 | B1 | 3/2006 | Vis |
| 7,079,342 | B1 | 7/2006 | Han et al. |
| 7,092,179 | B2 | 8/2006 | Yamanouchi |
| 7,123,429 | B2 | 10/2006 | Musungu et al. |
| 7,126,773 | B1 | 10/2006 | Taratorin |
| 7,193,802 | B2 | 3/2007 | Cideciyan et al. |
| 7,248,424 | B2 | 7/2007 | Ueno |
| 7,256,954 | B2 | 8/2007 | Serizawa |
| 7,262,928 | B1 | 8/2007 | Oberg |
| 7,271,753 | B1 | 9/2007 | Padukone et al. |
| 7,308,057 | B1 | 12/2007 | Patapoutian |
| 7,440,224 | B2 | 10/2008 | Ehrlich et al. |
| 7,495,854 | B2 | 2/2009 | Hutchins |
| 7,542,227 | B2 | 6/2009 | Che et al. |
| 7,715,135 | B1 | 5/2010 | Sutardja et al. |
| 7,733,591 | B2 | 6/2010 | Bottemiller et al. |
| 7,764,732 | B2 * | 7/2010 | Rollins et al. ................. 375/233 |
| 2002/0159350 | A1 | 10/2002 | Ogura |
| 2003/0048564 | A1 | 3/2003 | Koller et al. |
| 2005/0117243 | A1 | 6/2005 | Serizawa et al. |
| 2005/0135472 | A1 * | 6/2005 | Higashino ................... 375/233 |
| 2005/0213652 | A1 * | 9/2005 | Higashino ................... 375/233 |
| 2006/0061496 | A1 | 3/2006 | Stein et al. |
| 2006/0062125 | A1 | 3/2006 | Horie et al. |
| 2006/0176947 | A1 | 8/2006 | Lim |
| 2007/0041115 | A1 | 2/2007 | Lee |
| 2007/0047120 | A1 | 3/2007 | DeGroat |
| 2007/0076313 | A1 | 4/2007 | Hutchins et al. |
| 2007/0140088 | A1 | 6/2007 | Hino et al. |
| 2008/0031114 | A1 | 2/2008 | Hong et al. |
| 2008/0037153 | A1 | 2/2008 | Yoshizawa |
| 2008/0081382 | A1 | 10/2008 | Mathew |
| 2009/0230639 | A1 | 1/2009 | Liu |
| 2009/0033680 | A1 | 2/2009 | Ratnakar |
| 2009/0161245 | A1 | 6/2009 | Mathew |

OTHER PUBLICATIONS

U.S. Appl. No. 12/273,265, filed Nov. 18, 2008, Mathew.
U.S. Appl. No. 12/247,378, filed Oct. 8, 2008, Mathew.
U.S. Appl. No. 12/337,775, filed Dec. 18, 2008, Mathew.
U.S. Appl. No. 12/337,805, filed Dec. 18, 2008, Mueller.
U.S. Appl. No. 12/337,828, filed Dec. 18, 2008, Meuller.
U.S. Appl. No. 12/348,236, filed Jan. 2, 2009, Liu.
U.S. Appl. No. 12/337,850, filed Dec. 18, 2008, Mueller.
U.S. Appl. No. 12/352,540, filed Jan. 12, 2009, Liu.
U.S. Appl. No. 12/371,906, filed Feb. 16, 2009, Ratnakar Aravind.
U.S. Appl. No. 12/430,948, filed Apr. 28, 2009, Grundvig.
U.S. Appl. No. 12/463,626, filed May. 11, 2009, Mathew.
U.S. Appl. No. 12/510,222, filed Jun. 27, 2009, Ratnakar Aravind.
U.S. Appl. No. 12/558,928, filed Sep. 14, 2009, Mathew.
U.S. Appl. No. 12/652,201, filed Jan. 5, 2010, Mathew.
Cho and Lee, "An Estimation Technique for Nonlinear Distortion in High Density Magnetic Recording Channels", IEEE Transactions on Magnetics, vol. 34, No. 1, pp. 40-44 Jan. 98.
Degroat et al., "Experimental Characterization of Media Noise Based on Equalized Synchronized Drive Data", IEEE Trans. Magnetics, vol. 37, No. 2, pp. 633-638, Mar. 2001.
Farhang-Boroujeny, Adaptive Filters: Theory and Applications. John Wiley & Sons Ltd, 1998, Chapter 11. pp. 373-379.
Kavcic and Patapoutian, "A Signal-Dependent Autoregressive Channel Model", IEEE Trans. Magnetics, vol. 35 No. 5, pp. 2316-2318, Sep. 1999.
Lin et al. "An estimation technique for accurately modelling the magnetic recording channel including nonlinearities." IEEE Trans. Mag, vol. 25, No. 5, pp. 4084-4086, Sep. 1989.
Moon, J., "Signal-to-Noise Ratio Definition for Magnetic Recording Channels With Transition Noise", IEEE Trans. Magnetics, vol. 36, No. 5, pp. 3881-3883, Sep. 2000.
Palmer et al, "Identification of nonlinear write effects using pseudo-random sequences" IEEE Trans. Magnetics, vol. 23 No. 5, pp. 2377-2379, Sep. 1987.
Partovi; et al., "Flow-Through Latch and Edge-Triggered Flip-Flop Hybrid Elements"; Feb. 8, 1996; pp. 138-139; Solid-State Circuits Conf. 1996 Digest of Technical Papers.
Tokumasu et al. "A New Reduced Clock-Swing Flip-Flop (NDKFF)," Corporate Research & Development Center, Toshiba Corporation. IEEE Feb. 2002 Custom Intergrated Circuits Conf.
Wood and Donaldson, "The Helical-Scan Magnetic Tape Recorder as a Digital Communication Channel", IEEE Transactions on Magnetics, vol. MAG-15, No. 2, pp. 935-943 Mar. 1979.

* cited by examiner

000
SYSTEMS AND METHODS FOR ADAPTIVE EQUALIZATION IN RECORDING CHANNELS

CROSS REFERENCE TO RELATED APPLICATIONS

The present application claims priority to (is a non-provisional of) U.S. Pat. App. No. 61/016,231 entitled "Near Optimal Adaptive Equalization for Recording Channels", and filed Dec. 21, 2007 by Mathew et al. The entirety of the aforementioned application is incorporated herein by reference for all purposes.

BACKGROUND OF THE INVENTION

The present inventions are related to systems and methods for data transfer, and more particularly to systems and methods for equalizing data in relation to a data transfer.

The natural and uncontrolled inter-symbol interference (ISI) of the recording channel can be very long. Compensating for this inter-symbol interference in a channel detector is both complex and hardware intensive. A channel equalizer may be used prior to the channel detector in an effort to minimize the complexity thereof. The signal to noise ratio provided by such an equalizer effects the degree to which the complexity of the channel detector can be reduced. The signal to noise ratio of the equalizer is dependent upon the selection of the proper target, but such target selection is not a simple task and itself can involve substantial complexity.

Further, such target selection is typically done beforehand and a static target is used during system operation. Because of this, the target may or may not be valid depending upon the dynamic operation of the channel. To avoid the problems incident with static target selection, a user programmable target is often used. This type of a target allows for user modification when system changes are detected. Selecting the appropriate user programmable target often relies on a trial and comparison approach to arrive at a desired target value. Once a reasonable target value is determined, the value is programmed into a semiconductor device supporting the channel at issue. While this process allows for compensation of some of the changes from one channel to another, it is a very time consuming process requiring a search and calculation of a corresponding detection error rate for each point in the search space. Further, such an approach does not easily compensate for changing characteristics of a given channel.

Hence, for at least the aforementioned reasons, there exists a need in the art for advanced systems and methods for providing equalizer target selection.

BRIEF SUMMARY OF THE INVENTION

The present inventions are related to systems and methods for data transfer, and more particularly to systems and methods for equalizing data in relation to a data transfer.

Various embodiments of the present invention provide methods for adaptive equalization. Such methods include providing a data processing system with an equalizer circuit and a target filter circuit. The equalizer circuit performs equalization based at least in part on an equalizer coefficient. The methods further include generating an error based upon a first output from the equalizer circuit and a second output from the target filter circuit. An inter-symbol interference component is extracted from the error and used to calculate an equalizer gradient. Based at least in part on the equalizer gradient, the equalizer coefficient is calculated.

In some instances of the aforementioned embodiments, the methods further include providing a data input derived from a storage medium having a number of sectors with each sector having a number of samples to the equalizer circuit. In some cases, extracting the inter-symbol interference is done on a sample-by-sample basis, and calculating the equalizer coefficient is done on a sector by sector basis.

In various instances of the aforementioned embodiments, the target filter circuit performs filtering of the data input based at least in part on a target coefficient. In such instances, the method further comprises calculating a target gradient based at least in part in the error, and based at least in part on the target gradient, calculating the target coefficient. In some cases, both the target coefficient and the equalizer coefficient are constrained. In some cases, calculating the target coefficient is done on a sector by sector basis.

Other embodiments of the present invention provide equalization circuits that include an equalizer circuit operable to equalize a data input based upon an updatable equalizer coefficient, and to provide an equalized output. The circuits further include a target filter circuit operable to perform filtering of the data input based at least in part on a target coefficient, and to provide a target output. An error calculation circuit is included that determines a difference between the target output and the equalized output, and provides an error output. A data dependent averaging circuit extracts an inter-symbol interference component of the error output, and a gradient accumulation circuit is operable to calculate an equalizer gradient based at least in part on the inter-symbol interference component of the error output. An equalizer coefficient calculation circuit receives the equalizer gradient and calculates the updatable equalizer coefficient.

In some instances of the aforementioned embodiments, the data input is derived from a storage medium having a number of sectors with each sector having a number of samples. In some cases, extracting the inter-symbol interference is done on a sample-by-sample basis, the data dependent averaging circuit operates on a sample by sample basis to extract the inter-symbol interference component of the error output, and calculating the equalizer coefficient is done on a sector by sector basis.

In some instances of the aforementioned embodiments, the gradient accumulation circuit is further operable to calculate a target gradient. In such instances, the circuits further include a target coefficient calculation circuit that receives the target gradient and calculates the updatable target coefficient. In some such instances, the data input is derived from a storage medium having a number of sectors with each sector having a number of samples, and the target coefficient calculation circuit calculates the updatable target coefficient on a sector by sector basis.

Yet other embodiments of the present invention provide transmission devices that include a receiver operable to receive data from a transmission medium. The receiver includes an equalizer circuit operable to equalize a data input based upon an updatable equalizer coefficient, and to provide an equalized output. The circuits further include a target filter circuit operable to perform filtering of the data input based at least in part on a target coefficient, and to provide a target output. An error calculation circuit is included that determines a difference between the target output and the equalized output, and provides an error output. A data dependent averaging circuit extracts an inter-symbol interference component of the error output, and a gradient accumulation circuit is operable to calculate an equalizer gradient based at least in part on the inter-symbol interference component of the error output. An equalizer coefficient calculation circuit receives the equalizer gradient and calculates the updatable equalizer coefficient. In some cases, the transmission device is a storage device and the transmission medium is a magnetic storage medium. In other instances, the transmission device is a communication device and the transmission medium is a wireless transmission medium.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data transfer, and more particularly to systems and methods for equalizing data in relation to a data transfer.

Various embodiments of the present invention provide systems and methods for channel equalization. In some cases, such embodiments separate channel equalization into two distinct operations. In the first operation, optimal target and equalizer coefficients are determined to minimize any residual inter-symbol interference. In the second operation, data dependent noise prediction is realized. By dividing the problem into two operations (i.e., equalizer and target coefficient determination, and noise prediction filters), the optimization of each can be designed either together or separately without incurring a performance loss. In some cases, closed form expressions for the optimal target and equalizer coefficients may be used. In other cases, an adaptive algorithm is implemented. As just one advantage of the adaptive embodiments, a manual search for the best target is rendered unnecessary as through adaptive calculation the system is able to identify an optimal target. Further, the target and equalizer coefficients remain in an optimal range even under time varying channel conditions.

Figure 1:
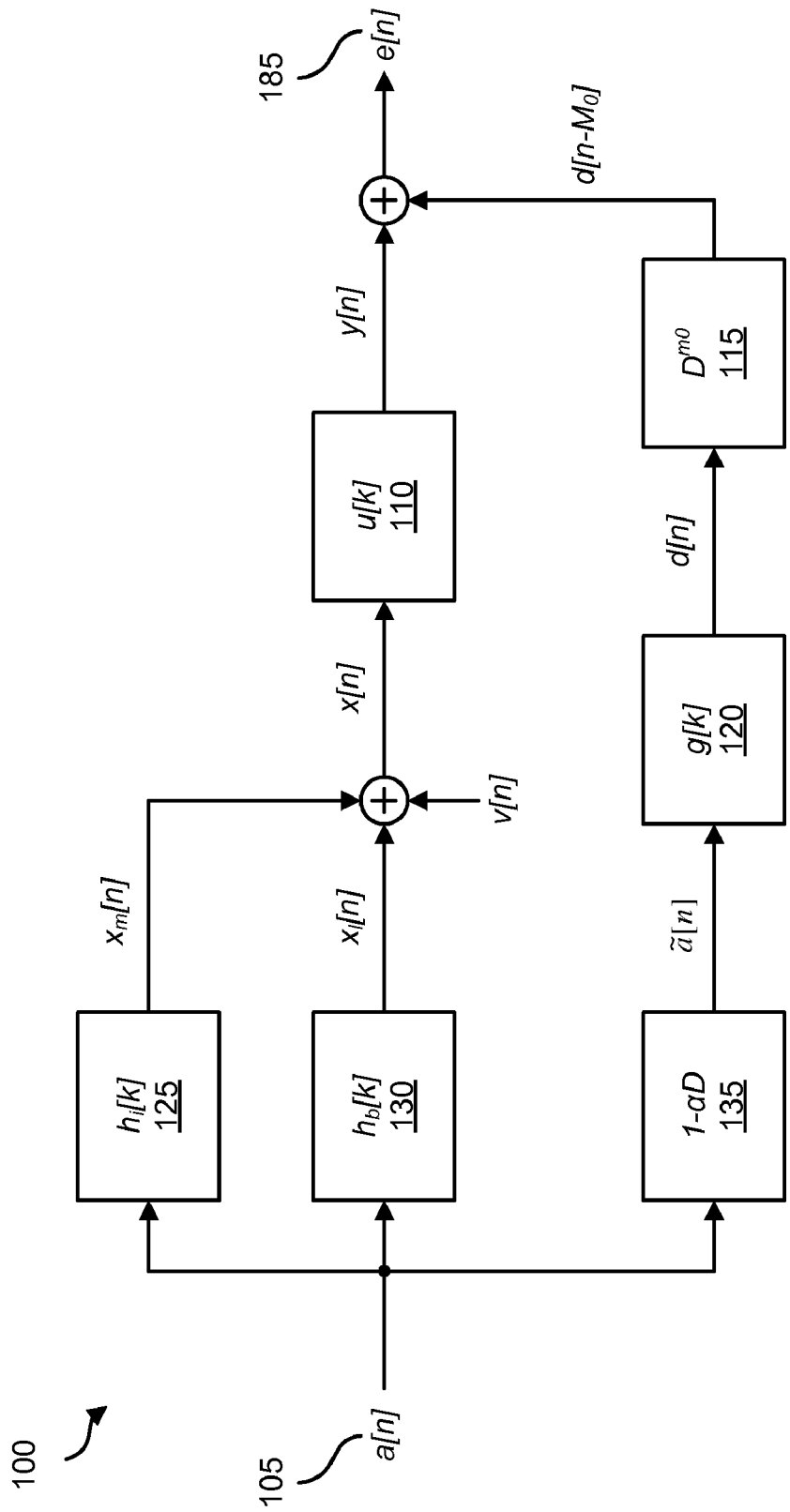
FIG. 1 shows a baud-rate model for error determination that may be utilized in relation to an adaptive equalization system in accordance with some embodiments of the present invention.

Turning to FIG. 1, a baud-rate model 100 used to describe the separation of constituent components of an error signal 185 is shown. In particular, an ideal output 105 provided by a downstream detector (not shown) represents the non-return to zero (NRZ) bits written to a storage medium. Ideal output 105 is applied to a bit response (represented by a bit-response block 130 $h_b[k]$ providing an output $x_m[n]$) and an impulse response (represented by an impulse response block 125 $h_i[k]$ providing an output $x_i[n]$). The bit response and the impulse response may be represented by the following equations:

$$h_b(t) = h_s(t+0.5T) - h_s(t-0.5T);$$
$$h_i(t) = \frac{\partial h_s(t)}{\partial t}.$$

Assuming the channel is band-limited and an ideal analog font-end (i.e., an ideal low pass filter with a cut-off frequency of $$+/- \frac{1}{2T}\Big)$$

is used, the baud rate of the signals at the output of an upstream analog to digital converter (not shown) may be represented by the following equations:

$$x[n] = x_l[n] + x_m[n] + x_r[n],$$

where $$x_l[n] = \sum_k a[k]h_b[n-k]; \; x_m[n] = -\sum_k b[k]\tau[k]h_i[n-k];$$

and $x_r[n] = v[n]$. In this case, $x_l[n]$ denotes the linear inter-symbol interference component, $x_m[n]$ denotes the media noise component, $x_r[n]$ denotes the electronics noise component, and $h_b[n]$ and $h_i[n]$ denote the baud rate samples $h_b[t-0.5 T]$ and $h_i[t]$, respectively, and $v[n]$ denotes the baud-rate samples of the band-limited electronics noise. Using a model that separates inter-symbol interference from noise allows for development of a primary target optimized for addressing the inter-symbol interference component and a bank of noise prediction filters optimized for addressing the noise components. Such segregation allows for addressing the respective problems independently and in some cases allows for easier optimization and a higher degree of optimization.

For derivation purposes, the form of the primary target represented by a target block 120 that is chosen is given by:

$$\tilde{G}[D] = (1-\alpha D)G[D], \text{ and}$$
$$G[D] = \sum_{i=0}^{N_g-1} g[i]D^i,$$

where $0 \leq \alpha \leq 1$ is a parameter that is programmable to allow control of the DC content of the target as implemented by a DC content block 135. In target block 120, $g[i]$ for $i=0, 1, \ldots, N_g-1$ denotes the target coefficients, and in a delay block 115, D denotes the one bit delay operator. If $\alpha$ is selected as zero, then the DC content of the target will depend upon the underlying raw channel.

In baud-rate model 100, an equalizer block 110 represents calculation of an equalizer output using the equalizer coefficients, u[k] for k=0, 1, . . . , $N_u$−1. Delay block 115 represents implementation of a delay from the channel input to the equalizer output, $m_0$. The output d[n] represents the output of a target block 120. Based on this information, an output error signal, e[n], can be expressed as:

$$e[n] = y[n] - d[n - m_0]$$
$$= \sum_{i=0}^{Nu-1} u[i]x[n-i] - \sum_{i=0}^{Ng-1} g[i]\tilde{a}[n-m_0-i]$$
$$= u^T x_n - g^T \tilde{a}_{n-m0},$$

where:
- u=[u[0], u[1], . . . , u[$N_u$−1]]$^T$,
- g=[g[0], g[1], . . . , g[$N_g$−1]]$^T$,
- $x_n$=[x[n], x[n−1], . . . , x[n−$N_u$+1]]$^T$, and
- $\tilde{a}_n$=[$\tilde{a}$[n], $\tilde{a}$[n−1], . . . , $\tilde{a}$[n−$N_g$+1]]$^T$ with $\tilde{a}$[n]=a[n]−α·a[n−1].

Using the aforementioned equations, error signal e[n] may be decomposed into constituent components:

$$e[n] = e_I[n] + e_m[n] + e_r[n],$$

where $e_I[n]$ denotes the residual inter-symbol interference, $e_m[n]$ denotes the media noise component, and $e_r[n]$ denotes the electronics noise component. Based on this, the constituent components of the error signal are defined by the following equations:

$$e_I[n] = \sum_{i=0}^{Nu-1} u[i]x_I[n-i] - \sum_{i=0}^{Ng-1} g[i]\tilde{a}\begin{bmatrix} n- \\ m_0 - \\ i \end{bmatrix} = u^T x_{I,n} - g^T \tilde{a}_{n-m0},$$

$$e_m[n] = \sum_{i=0}^{Nu-1} u[i]x_m[n-i] = u^T x_{m,n}, \text{ and}$$

$$e_r[n] = \sum_{i=0}^{Nu-1} u[i]x_r[n-i] = u^T v_n.$$

In this case, $x_{I,n}$=[$x_I$[n], $x_I$[n−1], . . . , $x_I$[n−$N_u$+1]]$^T$, $v_n$=[v[n], v[n−1], . . . , v[n−$N_u$+1]]$^T$, and $x_{m,n}$=[$x_m$[n], $x_m$[n−1], . . . , $x_m$[n−$N_u$+1]]$^T$. Note that because a[n], τ[n], and v[n] are mutually independent, the error components, $e_I$[n], $e_m$[n], and $e_r$[n] are mutually uncorrelated.

In one particular embodiment of the present invention where $N_u$=10, the following constraints are imposed on target block 120 and equalizer block 110:

$$\sum_{i=0}^{Ng-1} g[i] = \phi_1, u[3] = \phi_2, \text{ and } u[4] - u[2] = \phi_3, \quad \text{Equations 1a}$$

where $\phi_1$, $\phi_2$, and $\phi_3$ are constants chosen a priori. The constraints can be expressed as:

$$g^T i_0 = \phi_1 \text{ and } A^T u = \phi, \text{ where } A^T = [i_4, i_5 - i_3] \text{ and } \phi = [\phi_2, \phi_3]^T. \quad \text{Equations 1b}$$

In this case, $i_0$ is a $N_g$x1 vector of all 1's, and $i_k$ is a $N_g$x1 vector of all 0's except at location k where it is '1' for k=3, 4, 5. The foregoing assumes that the fourth tap is the main-tap of the equalizer. One of ordinary skill in the art will recognize several variations of these constraints suitable for equalizer and target filters.

The principle behind the proposed approach for designing the primary target, g[k], represented by target block 120, it to minimize the power of the residual inter-symbol interference. Using this idea, a closed form approach to the target design may be implemented in accordance with one or more embodiments of the present invention. To do so, the power of the inter-symbol interference may be expressed as:

$$P_{isi} = E\{e_I^2[n]\} = u^T R_I u + g^T R_{\tilde{a}} g - 2u^T R_{I,\tilde{a}} g,$$

where $R_I = E\{x_{I,n} x_{I,n}^T\}$, $R_{\tilde{a}} = E\{\tilde{a}_n \tilde{a}_n^T\}$, and $R_{I,\tilde{a}} = E\{x_{I,n} \tilde{a}_{n-m0}^T\}$. Here, $E\{*\}$ denotes the statistical expectation operator. From this, $P_{isi}$ is minimized subject to the previously defined constraints.

The Lagrange cost function underlying the aforementioned constrained minimization is given by:

$$L(u,g,\lambda_1,\lambda_2,\lambda_3) = u^T R_I u + g^T R_{\tilde{a}} g - 2u^T R_{I,\tilde{a}} g - 2\lambda_1(g^T i_0 - \phi_1) - 2\lambda^T (A^T u - \phi),$$

where $\lambda = [\lambda_2, \lambda_3]^T$, and $\{\lambda_1, \lambda_2, \lambda_3\}$ are the Lagrange multipliers. The gradients of L(u, g, $\lambda_1, \lambda_2, \lambda_3$) with respect to u and g are given by:

$$\nabla_u L = 2R_I u - 2R_{I,\tilde{a}} g - 2A\lambda, \text{ and}$$

$$\nabla_g L = 2R_{\tilde{a}} g - 2R_{I,\tilde{a}}^T u - 2\lambda_1 i_0.$$

Solving for u and g results in the following equations:

$$\text{equal. coef.} = u = \lambda_1 R_u R_{I,\tilde{a}} R_{\tilde{a}}^{-1} i_0 + R_u A\lambda, \text{ and}$$

$$\text{targ. coef.} = g = R_g R_{I,\tilde{a}}^T R_I^{-1} A\lambda + \lambda_1 R_g i_0,$$

where $R_u = [R_I - R_{I,\tilde{a}} R_{\tilde{a}}^{-1} R_{I,\tilde{a}}^T]^{-1}$ and $R_g = [R_{\tilde{a}} - R_{I,\tilde{a}}^T R_I^{-1} R_{I,\tilde{a}}]^{-1}$. Using the preceding equations, the following matrix equation is defined:

$$\begin{bmatrix} i_0^T R_g i_0 & i_0^T R_g R_{I,\tilde{a}}^T R_I^{-1} A \\ A^T R_u R_{I,\tilde{a}} R_{\tilde{a}}^{-1} i_0 & A^T R_u A \end{bmatrix} \begin{bmatrix} \lambda_1 \\ \lambda \end{bmatrix} = \begin{bmatrix} \phi_1 \\ \varphi \end{bmatrix}.$$

After solving for the Lagrange multipliers $\{\lambda_1, \lambda\}$ using the preceding matrix equation, the optimum equalizer and target coefficients can be obtained from the equalizer and target coefficient equations set forth above.

The (i, j)$^{th}$ elements of the correlation matrices $R_I$, $R_{\tilde{a}}$, and $R_{I,\tilde{a}}$ may be computed as follows. Assuming that the received data bits a[n] are independent and identically distributed, the following definitional equations are obtained:

$$R_I(i, j) = \sum_k h_b[k] h_b[k+i-j], \text{ for } i, j = 0, 1, \ldots, N_u - 1;$$

$$R_{\tilde{a}}(i, j) = (1+\alpha^2)\delta(i-j) - \alpha \begin{bmatrix} \delta(i-j-1) + \\ \delta(i-j+1) \end{bmatrix},$$

$$\text{for } i, j = 0, 1, \ldots, N_g - 1; \text{ and}$$

$$R_{I,\tilde{a}}(i, j) = h_b[m_0 + j - i] - \alpha h_b[m_0 + j - i + 1],$$

$$\text{for } i = 0, 1, \ldots, N_u - 1, \text{ and } j = 0, 1, \ldots, N_g - 1,$$

where δ(k) is '0' when k ≠ 0, and '1' when k = 0.

One of the steps in developing an adaptive algorithm is estimating the residual inter-symbol interference from error signal 185. This may be done by performing a data dependent averaging of error signal 185. Since electronics noise (v[n])

and position jitter ($\tau[n]$) are zero mean random processes and are independent of the data bits ($a[n]$), averaging of error signal 185 provided by data dependent averaging circuit 290 (shown in FIG. 2) will effectively eliminate the contributions from media noise and electronics noise, leaving the residual inter-symbol interference component for each pattern as the average.

Using the principle of constrained least-mean-square algorithm as is known in the art, an adaptive approach for calculating equalizer coefficients and target coefficients may be developed. In particular, the equations for calculating the equalizer coefficients and target coefficients can be derived as:

$$\tilde{u}[n+1] = u[n] - 2\mu_u x_n e_{d,k}[n],$$

$$\tilde{g}[n+1] = g[n] + 2\mu_g \tilde{a}_n e_{d,k}[n],$$

$$\text{equal. coef.} = u[n+1] = \tilde{u}[n+1] + \Theta_u[n], \text{ and}$$

$$\text{targ. coef.} = g[n+1] = \tilde{g}[n+1] + \Theta_g[n],$$

where $\mu_u$ and $\mu_g$ are the adaptation step sizes for the equalizer and the target, respectively. In this case, $e_{d,k}[n]$ is the estimate of the residual inter-symbol interference at the time instant n. The quantities $\Theta_u[n]$ and $\Theta_g[n]$ are obtained by determining the minimal amount of perturbations that would make $\tilde{u}[n+1]$ and $\tilde{g}[n+1]$ satisfy the constraints set forth in equations (1a-1c) above. That is, $\Theta_u[n]$ and $\Theta_g[n]$ are obtained by minimizing the following Lagrange cost functions:

$$L_u(\Theta_u[n], \lambda_u) = \Theta_u^T[n]\Theta_u[n] - 2\lambda_u^T[n](A^T u[n+1] - \phi, \text{ and}$$

$$L_g(\Theta_g[n], \lambda_g) = \Theta_g^T[n]\Theta_g[n] - 2\lambda_g^T[n](i_0^T g[n+1] - \phi_1,$$

where the 2x1 vector $\lambda_u[n]$ and scalar $\lambda_g[n]$ are Lagrange multipliers.

In view of the preceding, the gradients of $L_u$ and $L_g$ with respect to $\Theta_u[n]$ and $\Theta_g[n]$ are given by:

$$\nabla\Theta_u L_u = 2\Theta_u - 2A\lambda_u[n], \text{ and } \nabla\Theta_g L_g = 2\Theta_g - 2i_0 \lambda_g[n], \quad \text{Equations 2}$$

respectively. By setting the aforementioned gradients to zero and applying the constraints of equations (1) above, the optimum values for $\Theta_u[n]$ and $\Theta_g[n]$ can be determined. Doing such yields the following equations:

$$\Theta_u[n] = A(A^T A)^{-1}(\phi - A^T \tilde{u}[n+1]), \text{ and}$$

$$\Theta_g[n] = \frac{\phi_1 - i_0^T \tilde{g}[n+1]}{N_g} i_0.$$

By substituting, the following equations are derived:

$$\text{equal. coef.} = \qquad\qquad\qquad\qquad \text{Equation 3a}$$
$$u[n+1] = \tilde{u}[n+1] + A(A^T A)^{-1}\begin{pmatrix}\phi - \\ A^T \tilde{u}[n+1]\end{pmatrix}, \text{ and}$$

$$\text{targ. coef.} = g[n+1] = \tilde{g}[n+1] + \frac{\phi_1 - i_0^T \tilde{g}[n+1]}{N_g} i_0. \qquad \text{Equation 3b}$$

It can be verified that the immediately preceding equations satisfy the constraints $A^T u[n+1] = \phi$ and $i_0^T \tilde{g}[n+1] = \phi_1$. The preceding equations can be simplified since $A^T u[n] = \phi$ and $i_0^T \tilde{g}[n] = \phi_1$, resulting in the following equations for updated equalizer coefficients 215 (shown in FIG. 2) and updated target coefficients 270 (shown in FIG. 2):

$$\text{equal. coef.} = \qquad\qquad\qquad\qquad \text{Equation 4a}$$
$$u[n+1] = u[n] - 2\mu_u e_{d,k}[n](I_{Nu} - A(A^T A)^{-1} A^T)x_n,$$

$$\text{and targ. coef.} = g[n+1] = g[n] + 2\mu_g e_{d,k}[n]\left(\tilde{a}_n - \frac{i_0^T \tilde{a}_n}{N_g} i_0\right). \qquad \text{Equation 4b}$$

As an example, for $N_u=10$, $N_g=3$, and when the main tap of digital finite impulse response filter 110 is the fourth tap, the preceding equations for updated equalizer coefficients and updated target coefficients can be simplified as:

$$\text{equal.coef.} = u_i[n+1] = u_i[n] - 2\mu_u x[n-i]e_{d,k}[n],$$

for $i = 0, 1, 5, 6, 7, 8, 9$;

$$\text{equal.coef.} = u_i[n+1] = u_i[n] - \mu_u e_{d,k}[n](x[n-2] + x[n-4]),$$

for $i = 2, 4$;

$$\text{targ.coef.} = g_i[n+1] = g_i[n] + 2\mu_g e_{d,k}[n]\left(\begin{array}{c}\tilde{a}[n-m_0-i] - \\ \frac{\sum_{j=0}^{2}\tilde{a}[n-m_0-j]}{N_g}\end{array}\right),$$

for $i = 0, 1, 2$;

with $u_3$ always set equal to $\phi_2$ for all $n$.

Due to finite precision effects, the adapted coefficients may slowly drift away from the constraint satisfying region. Therefore, in some cases, the adaptive algorithm is implemented based on equations (3) above rather than equations (4). The tap-wise adaptive equations for the equalizer corresponding to equations (3) can be written in the simplified form as:

$$u_i[n+1] = u_i[n] - 2\mu_u x[n-i]e_{d,k}[n], \text{ for } i = 0, 1, 2, 5, 6, 7, 8, 9;$$

$$\tilde{u}[n+1] = 0.5\{u_2[n] + u_4[n] - 2\mu_u(x[n-2] + x[n-4])e_{d,k}[n]\};$$

$$u_2[n+1] = \tilde{u}[n+1] - \frac{\phi_3}{2}; \text{ and } u_4[n+1] = \tilde{u}[n+1] + \frac{\phi_3}{2}.$$

The adaptive equations for the target corresponding to equations (3) can be written in the simplified form as:

$$\tilde{g}_i[n+1] = g_i[n] + 2\mu_g \tilde{a}[n-m_0-i]e_{d,k}[n],$$

for $i = 0, 1, 2$; and $$g_i[n+1] = \tilde{g}_i[n+1] + \left(\frac{\phi_1 - \sum_{j=0}^{2}\tilde{g}_j[n+1]}{N_g}\right),$$

for $i = 0, 1, 2$, where $u_3[n] = \phi_2$ for all $n$.

Figure 2:
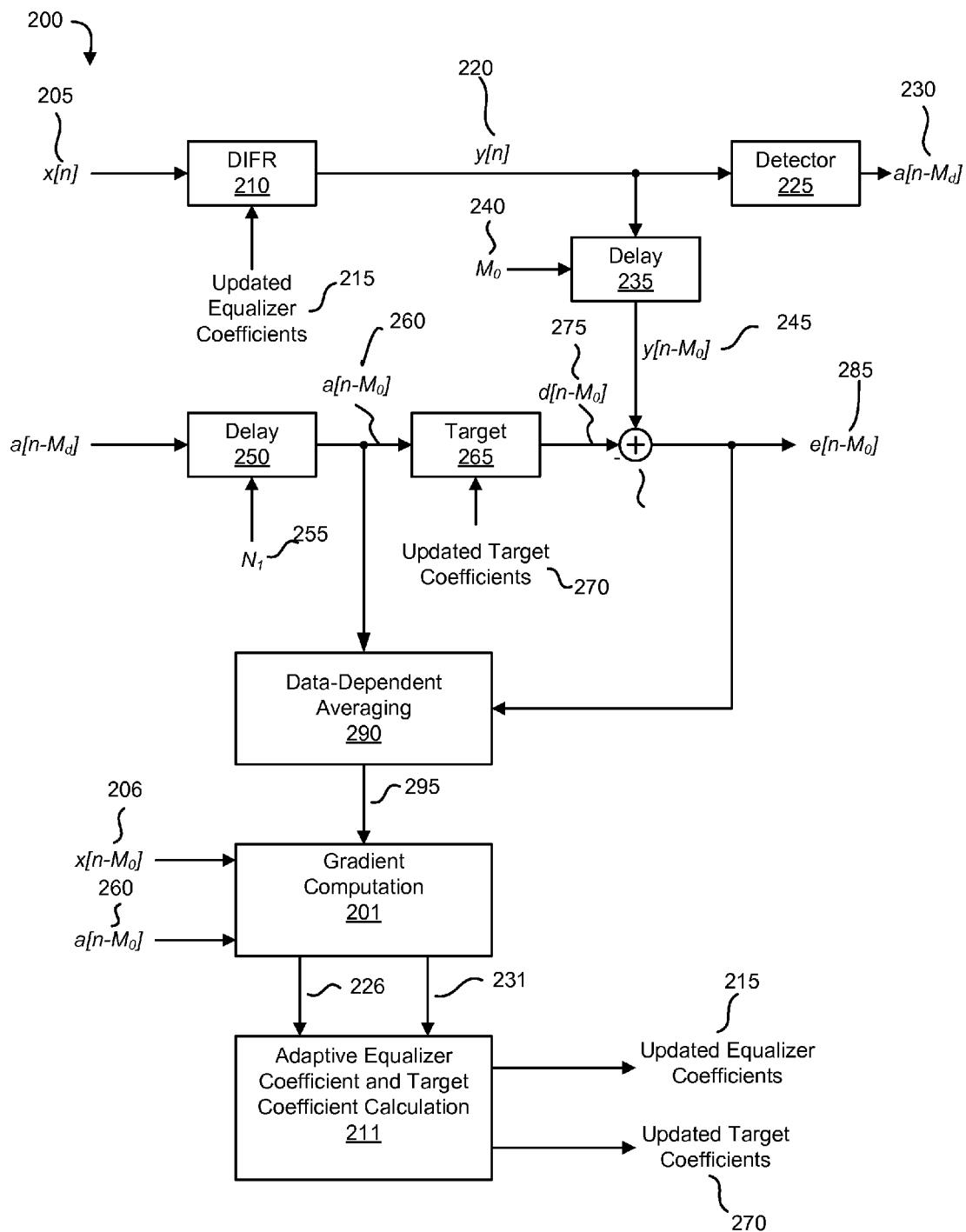
FIG. 2 depicts an adaptive equalization system in accordance with various embodiments of the present invention.

Turning to FIG. 2, an adaptive equalization system 200 is shown in accordance with various embodiments of the present invention. Adaptive equalization system 200 includes an equalizer implemented as a digital finite impulse response filter 210. Digital finite impulse response filter 210 receives a series of digital samples 205, x[n], performs an equalization process, and provides a corresponding series of equalized samples 220, y[n]. In some embodiments of the present invention, digital samples 205 are provided by an analog to digital converter (not shown). In some cases, digital samples 205 correspond to an analog input derived from a magnetic storage medium. In other cases, digital samples 205 correspond to an analog input derived from a communication channel. Based on the disclosure provided herein, one of ordinary skill in the art will recognize a variety of sources for digital samples 205. The equalization process is governed by updated equalizer coefficients 215. As more fully described below, updated equalizer coefficients 215 are adaptively calculated and therefore are capable of adjusting to time varying channel conditions. It should be noted that while the equalizer is implemented as a digital finite impulse response filter, other types of adjustable equalizers may be used in relation to different embodiments of the present invention.

Equalized samples 220 are provided to a detector 225 that performs a detection process and provides an ideal output 230, a[n−M$_d$] where M$_d$ is the detector latency. Detector 225 may be any detector known in the art that is capable of implementing a detection algorithm capable of regenerating an original input. Equalized samples 220 are also provided to a delay circuit 235 that delays the equalized samples by a delay value 240, M$_0$, and provides a delayed output 245, y[n−M$_0$]. Ideal output 230, a[n−M$_d$], is provided to a delay circuit 250 where it is delayed by a delay value 255, N$_1$, such that M$_0$=M$_d$+N$_1$, where N$_1$ is the number of pre-cursor components used in residual inter-symbol interference estimation. The resulting delayed output 260, a[n−M$_0$], is aligned in time with delayed output 245. Delayed output 260 is provided to a target filter 265 that operates in accordance with updated target coefficients 270. Target filter 265 provides a target output 275, d[n−M$_0$]. Target output 275 is subtracted from delayed output 245 using a summation element 280. The result of the subtraction is an error signal 285, e[n−M$_0$]. Error signal 285 represents the difference between the output of the equalizer, digital finite impulse response filter 210, and ideal output 230 after processing through target filter 265.

Error signal 285 and delayed output 260 are provided to a data dependent averaging circuit 290. Data dependent averaging circuit 290 separates the mis-equalization component (i.e., inter-symbol interference ($e_I$[n])) from the other constituent components of error signal 285. Since electronics noise (v[n]) and position jitter (τ[n]) are zero mean random processes and are independent of the data bits (a[n]), averaging of error signal 285 provided by data dependent averaging circuit 290 will effectively eliminate the contributions from media noise and electronics noise, leaving the residual inter-symbol interference component for each pattern as the average. Thus, a data dependent averaged output 295 ($e_{d,k}$[n]) of data dependent averaging circuit 290 is approximately equivalent to the inter-symbol interference or mis-equalization component ($e_I$[n]) of error signal 285.

Data dependent averaging may be done in accordance with the following approach where the pattern length is $N_c$ bits and the $n^{th}$ instant in time. Placing the window of the data pattern symmetrically around the current time instant n, the following is obtained:

$$\tilde{a}_{d,n} = \left\{ a\left[n - \frac{N_c-1}{2}\right], a\left[n - \frac{N_c-1}{2} + 1\right], \ldots, a\left[n + \frac{N_c-1}{2} - 1\right], a\left[n + \frac{N_c-1}{2}\right] \right\}, \text{ if } N_c \text{ is odd, and}$$

$$\tilde{a}_{d,n} = \left\{ a\left[n - \frac{N_c}{2} + 1\right], a\left[n - \frac{N_c}{2} + 2\right], \ldots, a\left[n + \frac{N_c}{2} - 1\right], a\left[n + \frac{N_c}{2}\right] \right\}, \text{ if } N_c \text{ is even.}$$

Then, the residual inter-symbol interference component can be estimated in accordance with the following equation:

$$\left.\begin{array}{l} n_k = n_k + 1 \\ e_{d,k}[n] = \frac{n_k - 1}{n_k} e_{d,k}[n-1] + \frac{1}{n_k} e[n] \end{array}\right\},$$

if $\tilde{a}_{d,n} = A_d(:,k)$, and $e_{d,k}[n] = e_{d,k}[n-1]$, otherwise.

In this case, $A_d$ is a $N_c \times 2^{N_c}$ matrix of all possible $N_c$-bits data patterns, $A_d$ (:,k) denotes the $k^{th}$ column of $A_d$, and $n_k$ is the number of times the data pattern corresponding to the $k^{th}$ column of $A_d$ has occurred in the input data sequence up to the $n^{th}$ instance in time. Positioning the data pattern window as set forth the in equation for $\tilde{a}_{d,n}$ results in capturing both post cursor inter-symbol interference and pre-cursor inter-symbol interference in $e_{d,k}$[n]. However, in some embodiments of the present invention, the pattern window may be positioned in accordance with the following equation to focus on pre-cursor inter-symbol interference in an effort to provide good equalization and detection performance:

$$\tilde{a}_{d,n} = \{a[n], a[n+1], \ldots, a[n+N_c-2], a[n+N_c-2]\}. \quad \text{Equation 5}$$

One of ordinary skill in the art will recognize that the data-dependent averaging process described above may also be implemented using any averaging methods such as exponential averaging, uniform averaging, windowed averaging, or the like.

Data dependent averaged output 295 is provided to a gradient accumulation circuit 201. In addition, gradient accumulation circuit 201 receives delayed output 260, a[n−M$_0$], and a delayed version of digital samples 205, x[n]. The delayed version of digital samples 205 is labeled as delayed output 206, x[n−M$_0$], and is aligned in time with delayed output 260. Based on these inputs, gradient computation circuit 201 calculates an equalization gradient 226 and a target gradient 231 in accordance with the following equations:

$$\text{equal. gradient} = \nabla_u e^2[n] = 2x_{n-M0} e_{d,k}[n], \text{ and}$$

$$\text{targ. gradient} = \nabla_g e^2[n] = -2\tilde{a}_{n-M0} e_{d,k}[n].$$

Equalization gradient 226 and target gradient 231 are provided to an adaptive equalizer coefficient and target coefficient calculation circuit 211. Adaptive equalizer coefficient and target coefficient calculation circuit 211 provides updated equalizer coefficients 215 to digital finite impulse response filter 210 and updated target coefficients 270 to target filter 265. In some embodiments of the present invention, updated equalizer coefficients 215 are calculated in accordance with equation (3a) above which is replicated below for convenience:

$$\text{equal. coef.} = u[n+1] = \tilde{u}[n+1] + A(A^T A)^{-1}(\phi - A^T \tilde{u}[n+1]),$$

where ũ[n+1]=u[n]−2μ_u x_{n−M0} e_{d,k}[n]. In such embodiments, updated target coefficients 270 are calculated in accordance with equations (3b) above which is replicated below for convenience:

$$targ.coef. = g[n+1] = \tilde{g}[n+1] + \frac{\phi_1 - i_0^T \tilde{g}[n+1]}{N_g} i_0,$$

where g̃[n+1]=g[n]+2μ_g ã_{n−M0} e_{d,k}[n]. In other embodiments of the present invention, updated equalizer coefficients 215 are calculated in accordance with equation (4a) above which is replicated below for convenience:

$$equal.\ coef.=u[n+1]=u[n]-2\mu_u e_{d,k}[n](I_{Nu}-A(A^TA)^{-1}A^T)x_n.$$

In such embodiments, updated target coefficients 270 are calculated in accordance with equations (4b) above which is replicated below for convenience:

$$targ.coef. = g[n+1] = \tilde{g}[n] + 2\mu_g e_{d,k}[n]\left(\tilde{a}_n - \frac{i_0^T \tilde{a}_n}{N_g} i_0\right).$$

In some embodiments of the present invention, implementing the aforementioned adaptive approach utilizes a separate target filter and equalizer used for adaptation purposes only, and existing apart from the target filter and equalizer on the main signal path which are not affected on a sample-by-sample basis. Such an approach avoids the necessity of using the adapting values of the target coefficients inside the detector while branch metrics and path metrics are computed. This approach is, however, hardware intensive as it requires an additional target filter and equalizer in parallel to those in the main signal path. Other embodiments avoid the additional hardware cost by using a modified adaptation strategy. The updated equalizer coefficients and updated target coefficients are adapted only once per sector. In some cases, this adaptation is done once at the end of each sector. In doing such, the instantaneous gradients for the equalizer and target filters are calculated for every sample continuing across the entire sector. At the end of the sector, or at some point in the sector, the accumulated gradients are used for calculating the updated equalizer coefficients and updated target coefficients.

Figure 3:
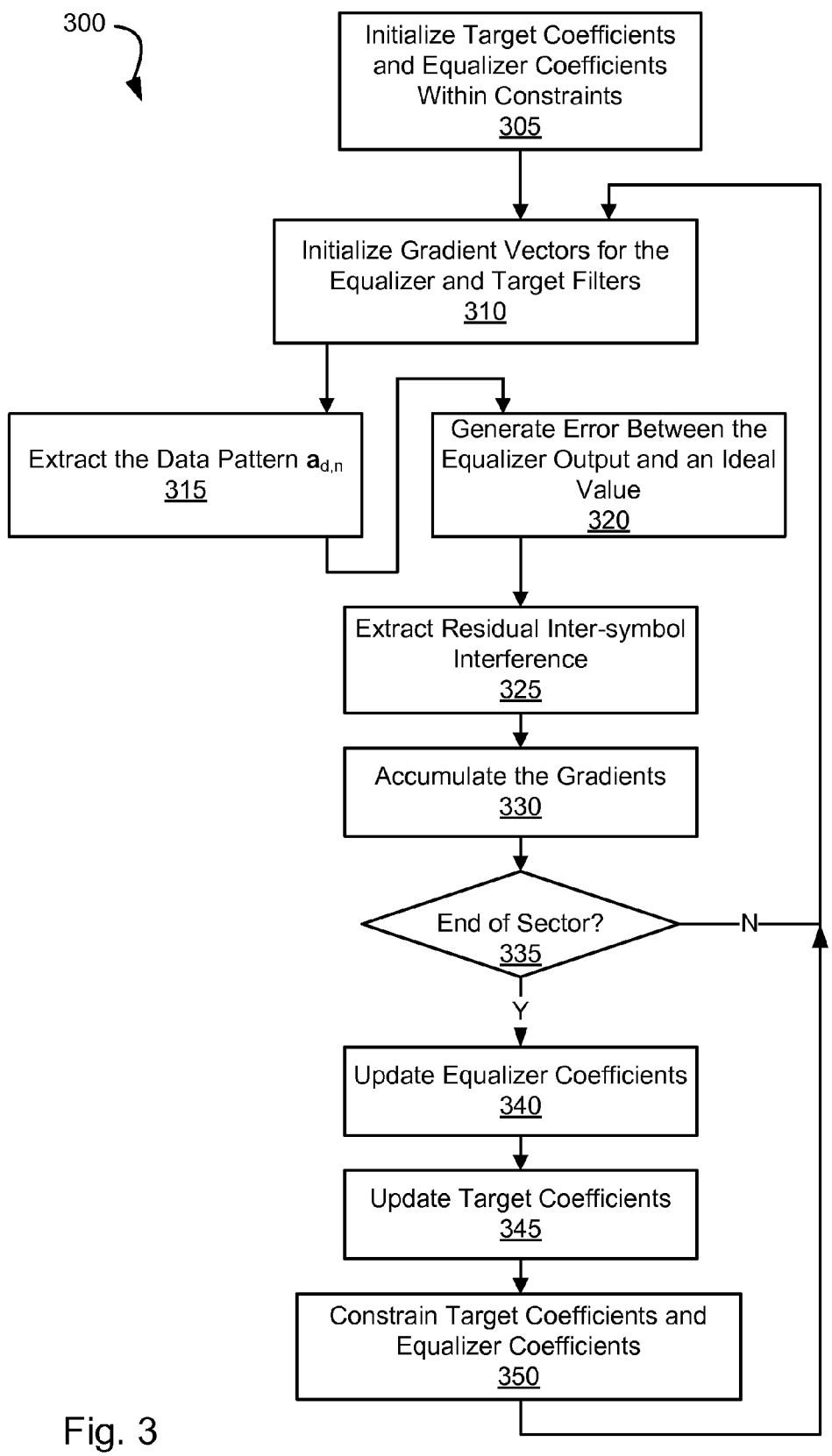
FIG. 3 is a flow diagram showing a method for adaptive equalization in accordance with one or more embodiments of the present invention.

The resulting algorithm for adapting the equalizer and target coefficients is described in relation to a flow diagram 300 of FIG. 3. Following flow diagram 300, equalizer and target coefficients are initialized to values within the selected constraints (block 305). The initial equalizer coefficients are referred to as u, and the initial target coefficients are referred to as g. For the constraints given in equations (1a)-(1b), any given target vector g=[g_0, g_1, g_2]^T and equalizer vector u=[u_0, u_1, ..., u_9]]^T can be made to satisfy the constraints as follows:

$$g_i \leftarrow g_i + \frac{\phi_1 - g_0 - g_1 - g_2}{3}, \quad i = 0, 1, 2$$

$$u_3 = \phi_2, \quad \tilde{u} = \frac{u_2 + u_4}{2}$$

$$u_2 = \tilde{u} - \frac{\phi_3}{2}, \quad u_4 = \tilde{u} + \frac{\phi_3}{2}$$

and u_i for i=0, 1, 5, 6, . . . , 9 remain unchanged. One of ordinary skill in the art will recognize that the above constraints satisfying approach can be easily generalized to equalizer and target vectors of any length and any type of linear constraints. The resulting constraints satisfying equalizer coefficients and target coefficients are applied to the equalizer and target filters of the main signal path. For each sector of data processed, the gradient vector for each of the equalizer calculation and the target calculation are initialized to zero (block 310). The equalizer gradient is referred to as q_u, and the target gradient is referred to as q_g. Then, the data pattern a_{d,n} corresponding to the current time instant is extracted (block 315). This may be done in accordance with equation (5) above as:

$$a_{d,n}=\{a[n], a[n+1], \ldots, a[n+N_c-2], a[n+N_c-2]\}.$$

The error at the equalizer output in the main signal path is then calculated (block 320). This may be done in accordance with the equation below that was previously described above in relation to FIG. 1:

$$e[n] = y[n] - d[n-m_0] =$$
$$\sum_{i=0}^{N_u-1} u[i]x[n-i] - \sum_{i=0}^{N_g-1} g[i]\tilde{a}[n-m0-i] = u^T x_n - g^T \tilde{a}_{n-m0}.$$

The residual inter-symbol interference (e_{d,k}[n]) corresponding to the immediate instance in time is then extracted (block 325). This process is repeated across a number of samples from the sector. In some cases, it is repeated for every sample in the sector. During a later portion of each sector, the gradients corresponding to the equalizer and target filters are accumulated (block 330). In some cases, this is done across the last half of the samples from the sector. The gradients are calculated and accumulated in accordance with the following equations:

$$q_u[n]=q_u[n-1]+x_{n-M0}e_{d,k}[n],\ \text{if } n>0.5N_s;\ \text{and}$$

$$q_g[n]=q_g[n-1]+\tilde{a}_{n-M0}e_{d,k}[n],\ \text{if } n>0.5N_s,$$

where q_u[n] and q_g[n] denote the accumulated gradients at an instance n, and N_s is the number of bits in the sector. It should be noted that in some cases, the multiplier 0.5 may be modified depending upon where in the sector accumulation is deigned to begin. Further, in some cases, computation of equalizer gradient may be simplified, for example, by using sign (x_{n−M0}) in place of x_{n−M0}.

It is then determined whether the end of the sector has been reached (block 335). Where the end of the sector has not yet been reached (block 335), the processes of blocks 310-330 are repeated for the subsequent sample. Alternatively, where the end of the sector has been reached (block 335), the equalizer coefficients are updated and the target coefficients are updated and constrained (blocks 340, 345, 350). In some embodiments of the present invention, the equalizer coefficients are updated and constrained in accordance with the following equations that were suggested above:

$$\tilde{u} \leftarrow u - 2\mu_u q_u[N_s],\ \text{and}$$

$$u \leftarrow \tilde{u} + A(A^TA)^{-1}[\phi - A^T u].$$

In such embodiments, the target coefficients are updated and constrained in accordance with the following equations that were suggested above:

$$\tilde{g} \leftarrow g + 2\mu_g q_g[N_s], \text{ and } g \leftarrow \tilde{g} + i_0 \frac{\phi 1 - i_0^T \tilde{g}}{N_g}.$$

In other embodiments of the present invention, the equalizer coefficients are updated and constrained in accordance with the following equations that were suggested above:

$$u_i \leftarrow u_i - 2\mu_u q_{u,i}[N_s], \text{ for } i = 0, 1, 2, 5, 6, 7, 8, 9;$$

$$\tilde{u} \leftarrow 0.5\{u_2 + u_4 - 2\mu_u(q_{u,2}[N_s] + q_{u,4}[N_s])\}; \quad u_2 \leftarrow \tilde{u} - \frac{\phi_3}{2}; \text{ and}$$

$$u_4 = \tilde{u} + \frac{\phi_3}{2},$$

Where $u_3$ is always set equal to $\phi_2$. In such embodiments, the target coefficients are updated and constrained in accordance with the following equations that were suggested above:

$$\tilde{g}_i = g_i + 2\mu_g q_{g,i}[N_s], \text{ for } i = 0, 1, 2; \text{ and}$$

$$g_i = \tilde{g}_i + \frac{\phi_1 - \sum_{j=0}^{2} \tilde{g}_j}{N_g}, \text{ for } i = 0, 1, 2,$$

where $u_3$ is always set equal to $\phi_2$. In this case, $q_{u,i}[N_s]$ and $q_{g,i}[N_s]$ are the $i^{th}$ and $j^{th}$ coefficients in the accumulated gradient vectors $q_u[N_s]$ and $q_g[N_s]$, respectively, for i=0, 1, . . . 9 and j=0, 1, 2.

Figure 4:
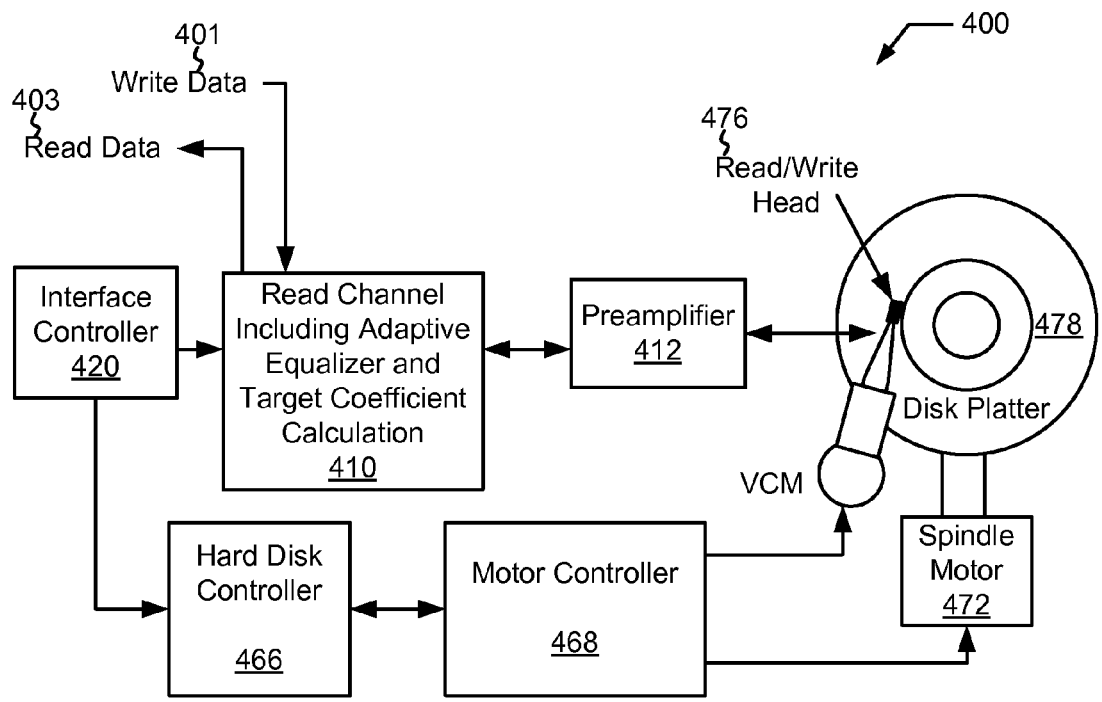
FIG. 4 depicts a storage system including a read channel with an adaptive equalizer and target coefficient calculation circuit in accordance with various embodiments of the present invention.

Turning to FIG. 4, a storage system 400 including a read channel with an adaptive equalizer and target coefficient calculation circuit 410 is shown in accordance with various embodiments of the present invention. Storage system 400 may be, for example, a hard disk drive. The incorporated adaptive calculation circuit is capable of adaptively calculating equalizer and target coefficients based upon a received data stream. Thus, the adaptive calculation circuit may be implemented in accordance with that described above in relation to FIGS. 1-3 above. In addition, storage system 400 includes an interface controller 420, a preamplifier 412, a hard disk controller 466, a motor controller 468, a spindle motor 472, a disk platter 478, and a read/write head 476. Interface controller 420 controls addressing and timing of data to/from disk platter 478. The data on disk platter 478 consists of groups of magnetic signals that may be detected by read/write head assembly 476 when the assembly is properly positioned over disk platter 478. In a typical read operation, read/write head assembly 476 is accurately positioned by motor controller 468 over a desired data track on disk platter 478. Motor controller 468 both positions read/write head assembly 476 in relation to disk platter 478 and drives spindle motor 472 by moving read/write head assembly to the proper data track on disk platter 478 under the direction of hard disk controller 466. Spindle motor 472 spins disk platter 478 at a determined spin rate (RPMs).

Once read/write head assembly 476 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is transferred from read/write head assembly 476 to read channel module 410 via preamplifier 412. Preamplifier 412 is operable to condition the minute analog signals accessed from disk platter 478. In addition, preamplifier 412 is operable to condition the data from read channel module 410 that is destined to be written to disk platter 478. In turn, read channel module 410 decodes (including adaptive targeting and equalization) and digitizes the received analog signal to recreate the information originally written to disk platter 478. This data is provided as read data 403 to a receiving circuit. A write operation is substantially the opposite of the preceding read operation with write data 401 being provided to read channel module 410. This data is then encoded and written to disk platter 478.

Figure 5:
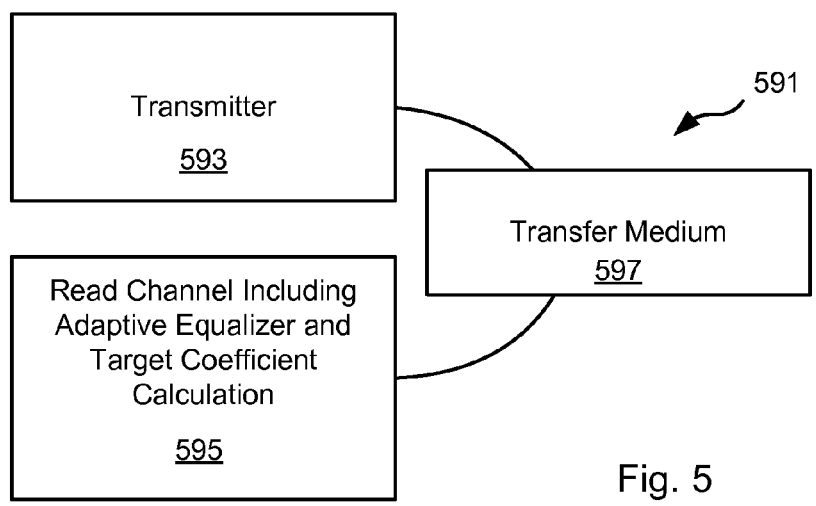
FIG. 5 shows a communication system including a receiver with adaptive targeting and equalization in accordance with different embodiments of the present invention.

Turning to FIG. 5, a communication system 591 including a receiver 595 with adaptive targeting and equalization is depicted in accordance with different embodiments of the present invention. Communication system 591 includes a transmitter 593 that is operable to transmit encoded information via a transfer medium 597 as is known in the art. The encoded data is received from transfer medium 597 by receiver 595. Receiver 595 incorporates an adaptive equalizer and target coefficient calculation circuit. The incorporated adaptive calculation circuit is capable of adaptively calculating equalizer and target coefficients based upon a received data stream. Thus, the adaptive calculation circuit may be implemented in accordance with that described above in relation to FIGS. 1-3. Based on the disclosure provided herein, one of ordinary skill in the art will recognize a variety of mediums for which equalization and targeting in accordance with embodiments of the present invention may be done.

In conclusion, the invention provides novel systems, devices, methods and arrangements for performing equalization and target filtering. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for adaptive equalization, the method comprising:
    providing a data processing system, wherein the data processing system includes an equalizer circuit and a target filter circuit, and wherein the equalizer circuit performs equalization based at least in part on an equalizer coefficient;
    generating an error based upon a first output from the equalizer circuit and a second output from the target filter circuit;
    extracting an inter-symbol interference component of the error;
    using the inter-symbol interference component to calculate an equalizer gradient; and
    based at least in part on the equalizer gradient, calculating the equalizer coefficient.

2. The method of claim 1, wherein the method further comprises:
    providing a data input to the equalizer circuit, wherein the data input is derived from a storage medium having a number of sectors with each sector having a number of samples.

3. The method of claim 2, wherein extracting the inter-symbol interference is done on a sample-by-sample basis.

4. The method of claim 3, wherein calculating the equalizer coefficient is done on a sector by sector basis.

5. The method of claim 1, wherein the target filter circuit performs noise prediction filtering based at least in part on a target coefficient, and wherein the method further comprises:
    calculating a target gradient based at least in part in the error; and
    based at least in part on the target gradient, calculating the target coefficient.

6. The method of claim 5, wherein the target coefficient is constrained.

7. The method of claim 5, wherein calculating the target coefficient is done on a sector by sector basis.

8. The method of claim 5, wherein the target gradient is calculated in accordance with the following equation:

$q_g[n+1] = q_g[n] + \tilde{a}_{n-M0} e_{d,k}[n]$; and wherein the target coefficient is calculated in accordance with the following equations:

$$\tilde{g} \leftarrow g + 2\mu_g q_g[N_s], \text{ and } g \leftarrow \tilde{g} + i_0 \frac{\phi 1 - i_0^T \tilde{g}}{N_g}.$$

9. The method of claim 1, wherein the equalizer coefficient is constrained.

10. The method of claim 1, wherein the equalizer gradient is calculated in accordance with the following equation:

$q_u[n+1] = q_u[n] + x_{n-M0} e_{d,k}[n]$; and wherein the equalizer coefficient is calculated in accordance with the following equations:

$\tilde{u} \leftarrow u - 2\mu_u q_u[N_s]$, and $u \leftarrow \tilde{u} + A(A^T A)^{-1} [\phi - A^T u]$.

11. The method of claim 1, wherein extracting an inter-symbol interference component of the error comprises:
    performing a data-dependent average of error values.

12. An adaptive equalization circuit, the circuit comprising:
    an equalizer circuit operable to equalize a data input based upon an updatable equalizer coefficient, and to provide an equalized output;
    a target filter circuit operable to filter the data input based at least in part on a target coefficient, and to provide a target output;
    an error calculation circuit, wherein the error calculation circuit determines a difference between the target output and the equalized output, and wherein the error calculation circuit provides an error output;
    a data dependent averaging circuit, wherein the data dependent averaging circuit extracts an inter-symbol interference component of the error output;
    a gradient accumulation circuit operable to calculate an equalizer gradient based at least in part on the inter-symbol interference component of the error output; and
    an equalizer coefficient calculation circuit that receives the equalizer gradient and calculates the updatable equalizer coefficient.

13. The circuit of claim 12, wherein the data input is derived from a storage medium having a number of sectors with each sector having a number of samples.

14. The circuit of claim 12, wherein the data dependent averaging circuit operates on a sample by sample basis to extract the inter-symbol interference component of the error output.

15. The circuit of claim 14, wherein the equalizer coefficient calculation circuit calculates the updatable equalizer coefficient on a sector by sector basis.

16. The circuit of claim 12, wherein the target coefficient is an updatable target coefficient, wherein the gradient accumulation circuit is further operable to calculate a target gradient, and wherein the circuit further comprises:
    a target coefficient calculation circuit that receives the target gradient and calculates the updatable target coefficient.

17. The circuit of claim 15, wherein the data input is derived from a storage medium having a number of sectors with each sector having a number of samples, and wherein the target coefficient calculation circuit calculates the updatable target coefficient on a sector by sector basis.

18. The circuit of claim 16, wherein the updatable target coefficient and the updatable equalizer coefficient are constrained.

19. A transmission device, wherein the transmission device includes:
    a receiver operable to receive data from a transmission medium, and wherein the receiver includes:
        an equalizer circuit operable to equalize a data input based upon an updatable equalizer coefficient, and to provide an equalized output;
        a target filter circuit operable to perform filtering of the data input based at least in part on a target coefficient, and to provide a target output;
        an error calculation circuit, wherein the error calculation circuit determines a difference between the target output and the equalized output, and wherein the error calculation circuit provides an error output;
        a data dependent averaging circuit, wherein the data dependent averaging circuit extracts an inter-symbol interference component of the error output;
        a gradient accumulation circuit operable to calculate an equalizer gradient based at least in part on the inter-symbol interference component of the error output; and
        an equalizer coefficient calculation circuit that receives the equalizer gradient and calculates the updatable equalizer coefficient.

20. The transmission device of claim 19, wherein the transmission device is a storage device, and wherein the transmission medium is a magnetic storage medium.

* * * * *